(12) United States Patent
Yetka et al.

(10) Patent No.: US 6,312,221 B1
(45) Date of Patent: Nov. 6, 2001

(54) END WALL FLOW PATH OF A COMPRESSOR

(75) Inventors: Chad J. Yetka, Chicago, IL (US); Steven M. Schirle, Anderson, SC (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/465,251

(22) Filed: Dec. 18, 1999

(51) Int. Cl.⁷ ..................................................... F01D 1/04
(52) U.S. Cl. ........................... 415/199.5; 415/219.1; 415/222; 415/914
(58) Field of Search .................. 415/199.5, 193, 415/209.1, 219.1, 220, 222, 914

(56) References Cited

U.S. PATENT DOCUMENTS 2,623,728 * 12/1952 Feilden et al. ................... 415/209.1
2,892,583 * 6/1959 Clarke ................................ 415/199.5
3,428,243 * 2/1969 Britt et al. ............................ 415/193

* cited by examiner

*Primary Examiner*—Christopher Verdier
(74) *Attorney, Agent, or Firm*—Norman Friedland

(57) ABSTRACT

The end wall of the compressor adjacent the stator vanes and compressor blades is configured so that the annular region between the vanes and blades is held at a constant area and that the flow path convergence of the stator is increased to compensate for the loss of convergence due to the reduction of convergence in the annular region between vanes and blades.

3 Claims, 3 Drawing Sheets

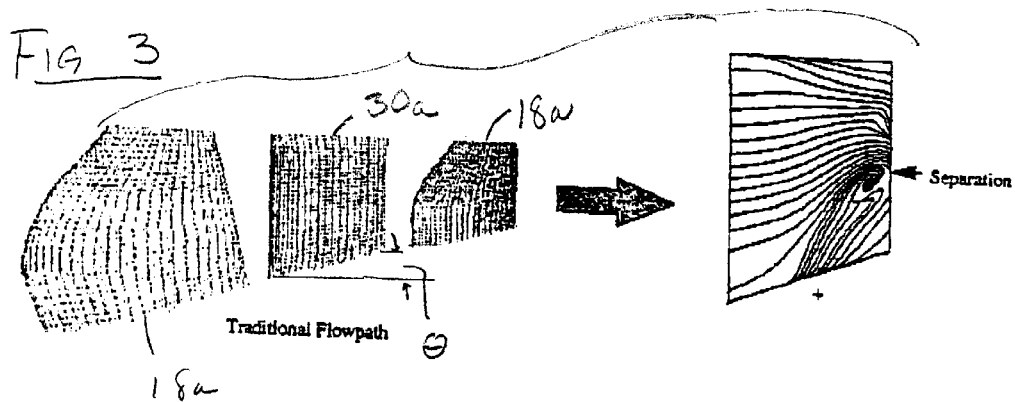
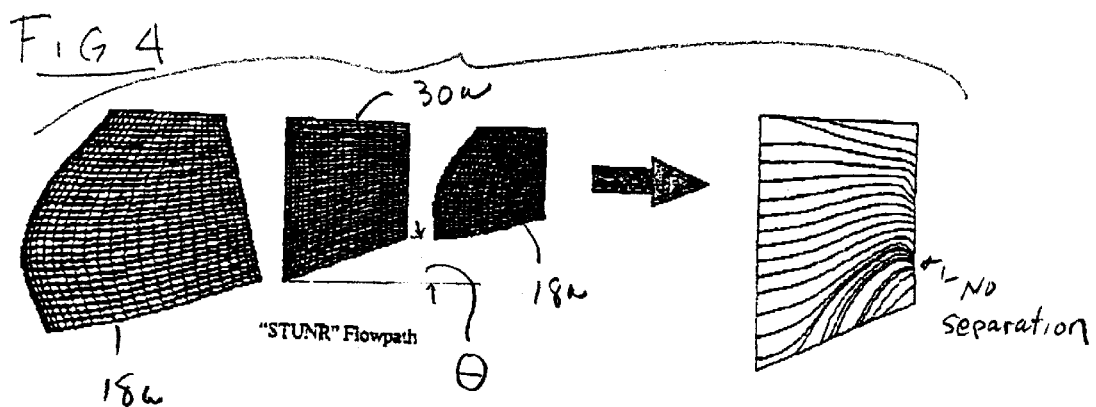

END WALL FLOW PATH OF A COMPRESSOR

This invention was made under a contract from the U.S. Government and the U.S. Government has rights herein.

TECHNICAL FIELD

This invention relates to the compressor section of an axial flow multi stage compressor of a gas turbine engine and particularly to the flow path and the curvature of the end wall of the compressor which defines the flow path through the stages of the compressor.

BACKGROUND OF THE INVENTION

As one skilled in this art appreciates, the compressor in a gas turbine engine is to provide high pressure air which is heated in the combustion section and expands over the turbine where energy is extracted to power the compressor and provide thrust for propelling the aircraft. The amount of energy left over after powering the compressor represents the useful jet thrust of the engine and this excess energy is very sensitive to the compressor efficiency. It is therefore imperative that the compressor operate at a high efficiency. Hence, the engine is designed so that the compressor pressurizes the most air through the particular configuration of the flow path in the compressor section consistent with optimum compressor efficiency over the range of engine operating conditions.

The operation of the compressor depends primarily on the lift force of the airfoils of the compressor blades. The approaching air flowing over these blades exerts lift and drag forces. If the angle of attack of the approaching air stream becomes too high the air resulting in an increase in drag and decrease in lift. If the angle of attack varies too far in the other direction the airflow will separate from the surface of the blade again increasing drag. If the speed of the airflow exceeds a certain value, the approach Mach number becomes too high and the airflow accelerating to pass around the airfoil will exceed the speed of sound and a shock wave will result cause turbulent flow and again an increase in drag.

In designing the compressor, the designer not only takes into consideration the flow velocity and the rotative speed of the compressor, but also must consider the cascade effect in a multiple stage of an axial compressor. In addition to being compatible with the remaining portion of the engine, namely, the combustor and turbine, consideration must be given to the mechanical aspect of the compressor. Once the inlet hub tip ratio of the compressor is determined which at best is a compromise between specific airflow and weight, the number of stages must be determined. Once the slope of the compressor is determined and the blade velocities and air velocities are known the number of stages can be determined. The work at each stage of compression will be dictated in accordance with the Mach number and stalling limits of the cascade.

Even after selecting the slope of the compressor which can be either the inner or other diameter, the number of stages and the velocities of the rotation of the blades and the velocity of the airflow, under certain operating conditions of an advanced gas turbine engine it was found that the compressor became highly loaded. It was therefore a problem to keep the stators from becoming overloaded resulting in a detriment to the efficiency of the compressor.

While traditionally the compressor end wall flow path is designed so that the rotor and stator leading and trailing edge diameters can be described by a smooth spline, we have found that we can solve the problem of overloading the stator by increasing the amount of flow path convergence across the stator. In accordance with this invention, we made the annulus area between blade rows constant. This serves to eliminate re-acceleration of the flow field and consequently reduce loss in static pressure.

SUMMARY OF THE INVENTION

An object of this invention is to improve or prevent deterioration of the efficiency of the compressor of a gas turbine engine that is overloaded at certain operational conditions.

A feature of this invention is to increase the amount of flow path convergence across the stator and making the area between blade rows constant.

The foregoing and other features of the present invention will become more apparent from the following description and accompanying drawings.

BRIEF DESCRIPTION OF THE DRAWINGS

FIG. 3 is a flow diagram illustrating the flow field in a compressor having traditional end walls; and FIG. 4 is a flow path with the end walls configured in accordance with this invention.

These figures merely serve to further clarify and illustrate the present invention and are not intended to limit the scope thereof.

DETAILED DESCRIPTION OF THE INVENTION

While the preferred embodiment of this invention is being detailed with a compressor having the slope formed on the outer diameter, it is to be understood, as one skilled in this art appreciates, the teachings of this invention are also applicable when the slope of the compressor is on the inner diameter or there is a mean diameter of sloping inner and outer diameters.

Figure 1:
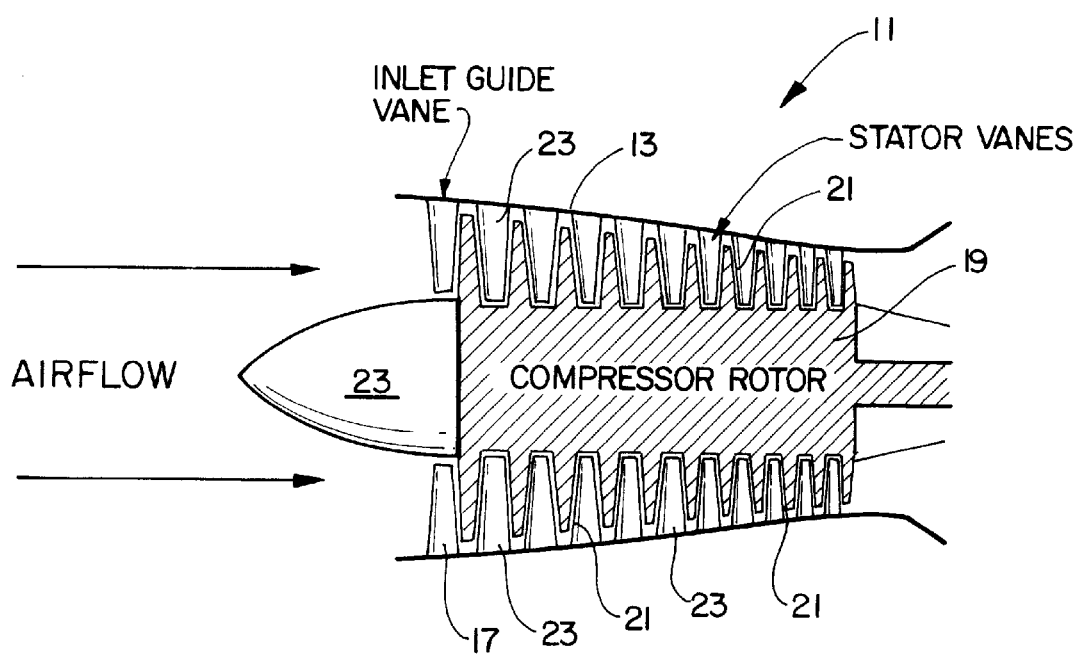
FIG. 1 is a cross sectional view of a prior art compressor rotor.
Figure 2:
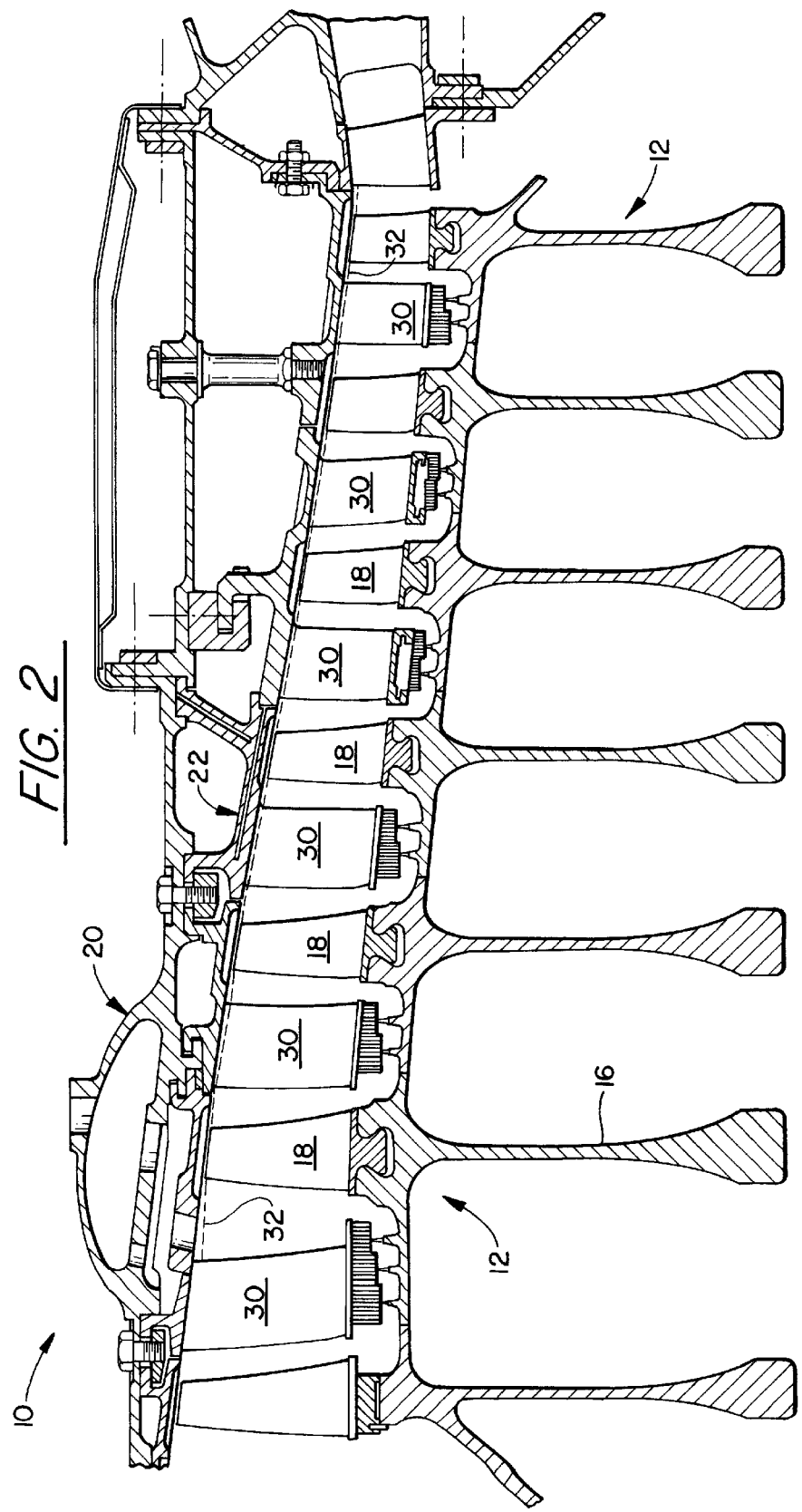
FIG. 2 a compressor modified to incorporate the present invention.

The invention can best be understood by referring to FIGS. 1 and 2 where FIG. 1 depicts a compressor rotor generally indicated by reference numeral 11 having a sloping outer case 13, a bullet shaped dome 23 at the inlet defining a diffuser and inlet duct 15, the inlet guide vanes 17, the drum rotor 19, the compressor blades 21 and the stator vanes 23. Air admitted into the inlet diffuser and duct 15 flows pass the inlet guide vanes 17 into the first of the cascaded blades 23 for the first stage of compression. As is apparent from the drawing the flow path of the axial compressor decreases in cross-sectional area in the direction of flow, reducing the volume of the air as compression progresses from stage to stage. Once the air leaves the inlet guide vanes and entering the first set of rotating blades, the air which is flowing in the axial direction is deflected in the direction of rotation. The air is arrested and turned as it is passed on to a set of stator vanes and then picked up by another set of rotating blades. The pressure of the air continuously increases as it passes each set of blades and stators as does the air velocity. As the air velocity increases, the ram pressure of the air passing through each stage also increases. This increase in velocity and pressure of the air is affected by diffusion. When the air is forced past the thick sections of the rotor blades the static pressure increases and because the larger area at the rear of the blades acts as a diffuser. In the stators, the velocity decreases while the static pressure increases. These diffusion effects are generally nullified in a typical compressor. However, when the compressor is designed for higher thrusts and optimum efficiency, the tendency is for the compressor to become overloaded at certain design operating points. Thus, as the air passes through the converging annular region between blades and stator vanes it loses static pressure which has to be recovered in the next stage.

The invention is best seen in FIG. 2 which shows the multi-stage compressor generally illustrated by reference numeral 10 having a compressor case 20 and a sloping outer diameter end wall 22. In this configuration the blades 18 are rotationally supported to the disks 16 in the rotating assembly 12 and the stator 22 supports a plurality of circumferentially fixed vanes 30. In accordance with this invention the cross sectional area between blades 18 and stator vanes 30 is maintained at a constant value. The end wall is configured as outlined by the dash lines 32. This assures that the static pressure in this region is not lost and that the flow path convergence only occurs between the blades 18 and vanes 30. In addition, the amount of flow path convergence is increased across the stator 30.

An analytical test has demonstrated that the stator unloading, no re-acceleration flow path (STUNR) teachings of this invention applied to a compressor resulted in significant improvements in compression system stability and efficiency. Additionally, at off-design conditions any mismatch in the flow path will result in a "waterfall" instead of a dam, thus, improving part power performance.

FIGS. 3 and 4 demonstrate the improvements attained by this invention. The grid configuration of FIG. 3 showing a traditional row of vanes 30a sandwiched by adjacent rows of blades and not constant areas of the region between blades and vanes. As seen in the flow path grid the air separates and adversely affects the static pressure and efficiency.

In FIG. 4, which shows the STUNR flow path, the areas of the region between blades and vanes are held constant and as seen by the flow path grid the air does not separate. What is meant by region is a plane in a given annular space between blade and vane. Hence, the adjacent vertical planes in the annular space have the same area and across the blades and vanes the area of adjacent vertical planes are not constant since the end wall slopes to define the flow path convergence. It will also be noted that the convergent angle θ is increased in the FIG. 4 configuration. All other components remain the same.

Although this invention has been shown and described with respect to detailed embodiments thereof, it will be appreciated and understood by those skilled in the art that various changes in form and detail thereof may be made without departing from the spirit and scope of the claimed invention.

We claim:

1. An axial flow multi-stage compressor having a sloping case defining an end wall, a plurality of rows of circumferentially spaced blades and a plurality of rows of circumferentially spaced vanes and each row of vanes precedes each row of blades with an annular space therebetween and being supported in said sloping case, the area of each annular region in said annular space being constant.

2. An axial flow multi-stage compressor as claimed in claim 1 including a stator for supporting said stator vanes, the flow path convergence of said stator being selected to compensate for the loss of flow path convergence manifested by making the annular regions between the annular space between the blades and stators constant.

3. An axial flow multi-stage compressor as claimed in claim 2 wherein the outer diameter of the compressor case is sloped.

* * * * *